United States Patent Office 2,812,379
Patented Nov. 5, 1957

2,812,379

INTER-ELECTRODE BATTERY SEPARATOR AND PROCESS FOR MAKING SAME

Meyer Mendelsohn, New York, and Frank Solomon, Jackson Heights, N. Y., assignors to Yardney International Corporation, New York, N. Y., a corporation of New York No Drawing. Application April 10, 1953,
Serial No. 348,127

2 Claims. (Cl. 136—143)

Our present invention relates to inter-electrode separators for electric cells, more particularly for batteries or accumulators of the alkaline type.

In U. S. Patent No. 2,635,127, issued April 14, 1953, to Michel N. Yardney and Martine E. Kagan, there has been disclosed a separator in the form of a sheet of polyvinyl alcohol, held under pressure between a negative (e. g. zinc) and a positive (e. g. silver) electrode in an alkaline electrolyte. The patent also suggests the use of bifunctional agents for the purpose of forming cross-linkages between the chains of the polymer, thereby increasing the stability of the material at the expense of a slight increase in electrolytic resistance.

An object of our present invention is to provide a modified polyvinyl alcohol adapted to serve as a separator material and exhibiting reduced electrolytic resistance together with improved mechanical and chemical stability, as well as a process for making such modified polyvinyl alcohol.

It is also an object of this invention to provide a process for reducing the brittleness of polyvinyl alcohol without the use of conventional plasticizers, such as formaldehyde or glycerine, the presence of which has been found objectionable in alkaline cells of the character set forth.

We have found, in accordance with the present invention, that the lower monohydroxy alcohols (methyl, ethyl, propyl, butyl) can be used to treat ordinary, unplasticized polyvinyl alcohol sheets to produce a separator material for electric batteries of the alkaline type which will be more effective than the untreated polyvinyl alcohol to stop penetration by harmful metal ions, especially zinc ions, while at the same time exhibiting a markedly lower electrolytic resistance. We have also found that treatment with monohydroxy alcohols of not more than two carbon atoms (methyl or ethyl alcohol) will render the polyvinyl alcohol sheet supple and flexible, thereby preventing the formation of harmful creases and cracks when the sheet is wound around an electrode.

*Example*

A sheet of unplasticized polyvinyl alcohol is immersed for three days, at room temperature, in methyl alcohol $CH_3OH$. The sheet is then allowed to dry in air over night.

Measurements made after one-day soaking in potassium hydroxide KOH show a reduction of electrolytic resistance to about 0.3 ohm per square centimeter, or to approximately one-third of the resistance of the untreated sheet.

Analogous treatments with progressively higher aliphatic alcohols, up to and including butyl alcohol, show a similar reduction in resistance. In the case of methyl and ethyl alcohols, however, a particular suppleness of the resultant product is obtained. The modified sheet material produced by the treatment is believed to be in each case an ether of polyvinyl alcohol with a methyl or other alkyl group.

It may be mentioned that the alcohols used in these treatments should be as nearly absolute as possible, in view of the solubility of polyvinyl alcohol in water. This solubility, however, appears somewhat reduced in the final product obtained by the treatment according to our invention.

We claim:

1. In an electric battery having an alkaline electrolyte, a separator comprising a sheet of polyvinyl alcohol modified by prolonged immersion in a substantially anhydrous monohydroxy alcohol of not more than four carbon atoms.

2. In an electric battery having an alkaline electrolyte, a separator comprising a sheet of polyvinyl alcohol modified by prolonged immersion in a substantially anhydrous monohydroxy alcohol selected from the group which consists of ethyl alcohol and methyl alcohol.

References Cited in the file of this patent

UNITED STATES PATENTS

| | | |
|---|---|---|
| 2,109,883 | Hermann et al. | Mar. 1, 1938 |
| 2,373,782 | Scheiderbauer | Apr. 17, 1942 |
| 2,356,282 | Stamatoff | Aug. 22, 1944 |
| 2,430,372 | Stamatoff | Nov. 4, 1947 |
| 2,635,127 | Yardney et al. | Apr. 14, 1953 |
| 2,648,717 | Ross et al. | Aug. 11, 1953 |

OTHER REFERENCES

Jones: British Plastics, March 1944, vol. 16, No. 178, pp. 122 to 125.

Du Pont: "Elvanol" Polyvinyl Alcohols 1947, pages 5 and 39.